Patented Apr. 22, 1941

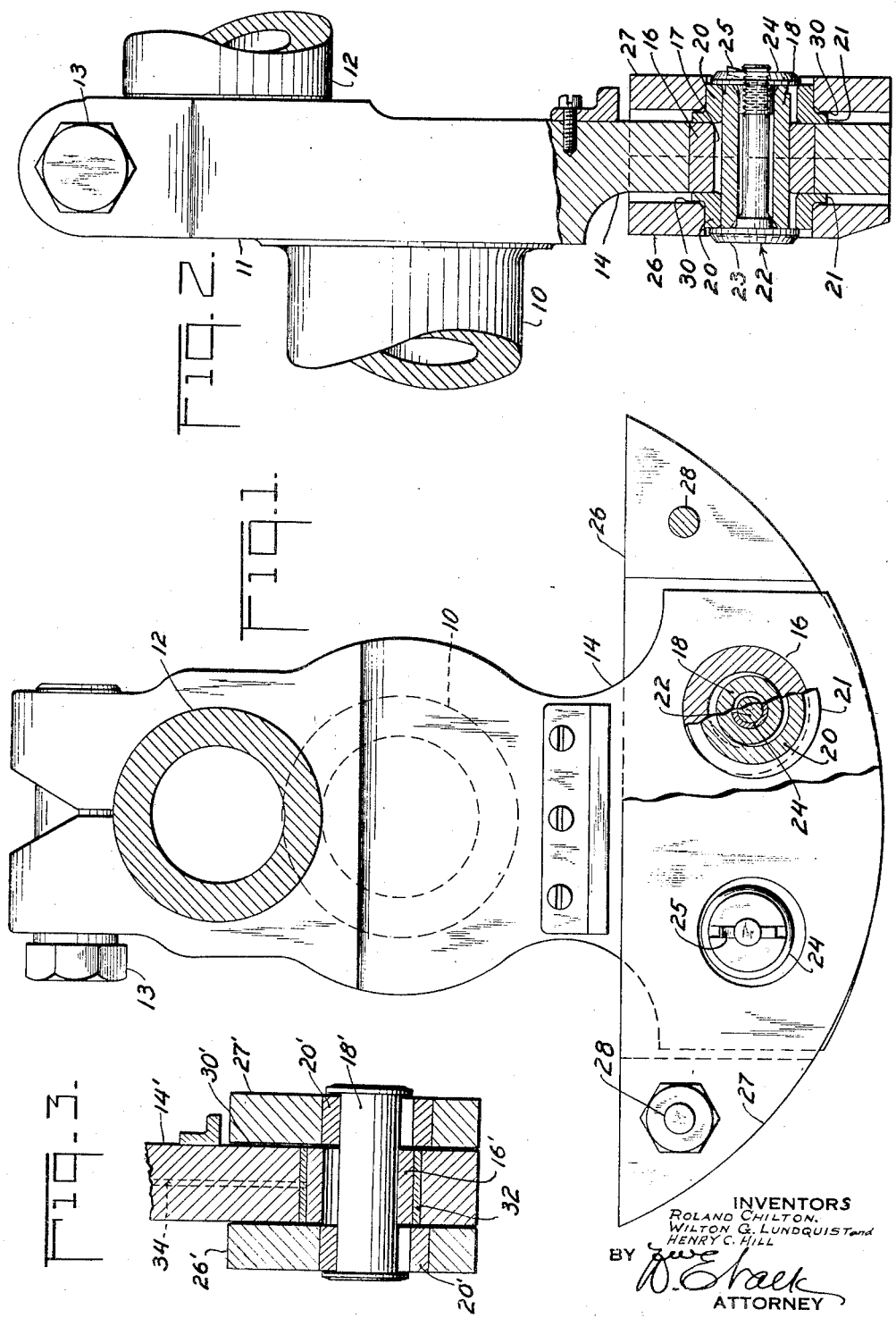

2,239,078

UNITED STATES PATENT OFFICE 2,239,078

DYNAMIC DAMPER

Roland Chilton, Ridgewood, Wilton G. Lundquist, Hohokus, and Henry C. Hill, Paterson, N. J., assignors to Wright Aeronautical Corporation, a corporation of New York Application February 28, 1940, Serial No. 321,166

14 Claims. (Cl. 74—604)

This invention relates to torsional balancing means for engines and in particular comprises improvements in the type of pendulum counterweight disclosed in Chilton Patent No. 2,112,984, issued April 5, 1938.

Said patent discloses a device which has become known as a "dynamic damper," wherein a relatively heavy crankshaft counterweight is loosely supported on a crankcheek extension by means of spaced pins loosely engaging bores in the counterweight and in the extension, whereby the counterweight may move freely in an arcuate path relative to the extension. Said arcuate path has a radius appropriate to obtain a fixed number of swings of the counterweight per crankshaft revolution whereby the counterweight may be timed to swing in resonance with exciting torsional impulses delivered to the pin of the crankshaft. The dynamic damper according to the Chilton teaching has gone into extensive use and has been eminently successful but in some instances it has been found that types of vibrations having a direction more or less parallel to the crankshaft axis induce relative axial movement between the counterweight and the crankcheek extension by which the counterweight supporting pins may be moved axially in their bores, with sliding at the contacts, in addition to rolling, which is found to induce scuffing of the surfaces of the pin and bore walls.

It is an object of this invention to provide such an improvement in the patented structure as to inhibit the aforementioned scuffing by allowing slight axial freedom between the crankcheek extension and counterweight, the axial movement being confined to sliding on bearing surfaces of large contact area distinct from the rolling contact zones. In other words, the object is to provide floating bushings in a pendulum counterweight system which are free to float axially in the members carrying them.

A further object is to provide flange abutments between the extension and counterweight members to limit the relative axial movement and to prevent contact of the steel elements of the system, the abutments comprising elements having good bearing characteristics.

A further object is to confine the several elements of the rolling support against relative axial movement.

Further objects of the invention will become apparent in reading the annexed description and claims and in viewing the drawing, in which:

Fig. 1 is an end elevation of an engine crankshaft, partly in section and partly broken away to show the structural details, Fig. 2 is a side elevation of a portion of a crankshaft, partly broken away, and Fig. 3 is a section through a shaft extension and counterweight showing an alternative form of the invention.

The crankshaft shown in Figs. 1 and 2 of the drawing is typical of the type used in a radial air cooled aircraft engine and comprises a shaft journal 10 integral with a crankcheek 11 to which a crankshaft 12 is rigidly secured by a clamp bolt 13. The crankcheek is extended on the opposite side of the crankshaft from the pin to comprise a crankcheek extension 14 which is provided with spaced bores axially parallel to the crankshaft, receiving hardened bushings 16, the latter being a press fit in the extension. The bores of said bushings comprise arcuate tracks 17 through which hardened pins 18 are passed, said pins being of smaller diameter than the openings in the bushings 16.

Upon the overhanging ends of the pins 18, bushings 20 are carried, said bushings having integral flanges 21 in close running clearance with the end faces of the bushing 16 and the extension 14. Also, the bushings 20 have bores of substantially the same diameter as the bores 17, whereby the pins 18 may roll upon the bores of respective bushings to comprise a free rolling pendulous connection between the extension and counterweight. The pins 18 are hollow and bolts 22 are passed therethrough, the head 23 of each bolt overlying the outer end of its bushing 20, and the nut 24 at the opposite end of the bolt comprising a flange overlying the end of the opposite bushing 20. The nut 24 is fully tightened against the pin 18 and is secured by a cotter 25. The pin 18 is of such length that the combined thickness of the two bushings 20 and of the extension 14 provides a minimum free running clearance between the bushings 20 and the extension 14 and between the bushings 20 and the head and nut 23 and 24, respectively, of each bolt 22. Counterweight halves 26 and 27 are assembled around the extension 14 and are provided with bores engaged in a running fit with the bushings 20, the counterweight halves abutting at their ends and being secured by bolts 28 and being recessed to have free clearance around the extension 14, the recess allowing a clearance 30 between the inner faces of the counterweight halves and the outer faces of the flanges 21 so as to permit a preselected axial movement of the counterweight assembly along the bushings 20. Such movement is limited by abutment of the counterweight with one or more of the flanges 21.

Thus, the pins 18 provide a pendulum support for the counterweight allowing for free oscillation of the latter in the plane of rotation, but the clearance 30 between the counterweight halves and the bushings 20 allows of slight axial movement of the counterweight with respect to the extension 14, divorcing such axial movement from the roller contacts toward the end of inhibiting scuffing of the roller pins.

In Fig. 3 an alternative arrangement is shown in which a bearing bushing 32 is rigid with the extension 14; the hardened roller bushing 16' being a free fit therein for rotational and axial drift. Effective lubrication of the bearing between elements 16' and 32 is provided for by an oil passage 34 leading thereto, through the extension 14', from the normal engine lubricating system. The pins 18' have integral flanges after the manner of those shown in the Chilton patent, and the bushings 20' are rigid in the counterweight halves 26' and 27'. The conventional end clearance 30' is allowed between the extension with its bushings and the counterweight with its bushings. The friction between the rollers 18' and the tracks on which they roll is greater than that between the well lubricated engagement of the bushings 16' and 32, whereby, upon axial vibration of the extension 14', the bushing 16' along with the pins and counterweight move bodily with respect thereto, inhibiting scuffing on the rolling contact surfaces.

From the two embodiments shown, it is apparent that the axially free connection may be located either within the counterweight or within the extension, and it is within the scope of the invention to have a connection for free axial movement in both such members.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a torsion balancing system, a shaft extension having a bore and a bushing fitted thereto, a counterweight mass loosely embracing the extension having bores and axially slidable bushings fitted thereto, and a loose pin passing through the several bushings having means to constrain the bushings and pin against relative axial movement, the mass being free to move axially on the bushings therein.

2. In a torsion balancing system, a shaft extension having a bore and a bushing fitted thereto, a counterweight mass loosely embracing the extension having bores and axially slidable bushings fitted thereto, and a loose pin passing through the several bushings having means to constrain the bushings and pin against relative axial movement, the mass being free to move axially on the bushings therein, said mass bushings having flanges projecting into the space due to the looseness between the extension and mass to provide an abutment for the mass upon axial movement thereof.

3. In a shaft system comprising an extension member and a counterweight member, one embracing the other, said members having eccentrically related bores, a bushing axially slidable in the bore of one said member, rolling means passing through the bushing and the bore of the other member establishing a pendulous counterweight support, said rolling means including constraining means to hold the bushing and the other member against relative axial movement, said one member being free to drift axially upon said bushing.

4. In a counterweight member connection to a shaft extension member, both said members having relatively eccentric bores, an axially slidable bushing in the bore of one member, said bushing being in running end contact with an end face of the other member adjacent its bore, and a pin passing through the bore of the other member and bushing bore and including means to restrain the bushing and other member against relative axial movement.

5. In a pendulous torsional damper a shaft member having a bore, a pin passing loosely therethrough, bushings on the projecting pin ends, means to locate the bushings, pin, and shaft member against axial displacement, and a counterweight having bores within which the bushings are rotatable and axially slidable, said counterweight being free to move axially on the bushing upon axial vibration of the shaft member.

6. In a pendulous counterweight for an engine crankshaft comprising a shaft extension loosely embraced by a counterweight mass, a hardened bushing rigid in the extension, alined bushings axially slidable in the mass, the latter bushings being eccentric relative to the extension bushings and having running clearance with the ends thereof, a roller pin contacting the bores of respective bushings and comprising a support for the mass, and flange ends on said pin constraining the several bushings and the pin against relative axial movement, said mass being free to move axially in virtue of its sliding engagement with the bushings therein.

7. In a pendulum counterweight for a shaft system comprising a shaft extension member and a counterweight member, one embracing the other, a floating bushing in at least one member, the other member having a bore, and a roller pin rollably contacting the bore and bushing walls, the embracing member having axial clearance relative to the embraced member.

8. In a pendulum counterweight for a shaft system comprising a shaft extension member and a counterweight member, one embracing the other, a floating bushing in at least one member, the other member having a bore, a roller pin rollably contacting the bore and bushing walls, the embracing member having axial clearance relative to the embraced member, and means securing the bushing, bored member and pin against relative axial movement whereby the bushing carrying member is free to float axially upon the bushing floatably carried therein.

9. In a pendulum counterweight for a shaft system, a shaft extension having a bore, a loose pin rollably engaging the bore wall, loose bushings hanging upon the projecting pin ends, the latter having flanges securing the pin and bushings against axial displacement relative to the shaft extension, and a counterweight embracing the extension in clearance relation and having bores within which said bushings are floatingly engaged.

10. In a pendulum counterweight for a shaft system, a shaft extension having a bore, a loose pin rollably engaging the bore wall, loose bushings hanging upon the projecting pin ends, the latter having flanges securing the pin and bushings against axial displacement relative to the shaft extension, and a counterweight embracing the extension in clearance relation and having bores within which said bushings are floatingly engaged, the bushings having flanges between the extension and counterweight forming abutments limiting axial movement of the counterweight relative thereto.

11. In a pendulum counterweight system, a shaft extension having a bore, a hardened bushing fitted thereto for free axial and rotational drift, a roller pin smaller in diameter than the bushing bore and rollably engaging the surface thereof, and a counterweight embracing the extension having tracks rollably engaged with said pins.

12. In a pendulum counterweight system, a shaft extension having a bore, a hardened bushing fitted thereto for free axial and rotational drift, a roller pin smaller in diameter than the bushing bore and rollably engaging the surface thereof, a counterweight embracing the extension having tracks rollably engaged with said pins, and means to feed lubricant to the hardened bushing surface where it engages the extension.

13. In a pendulum counterweight system, a shaft extension, a bearing bushing fitted rigidly thereto, a hardened bushing within, and rotationally and axially free relative to the bearing bushing, a pin rollably engaged with the hardened bushing bore wall, and an extension embracing counterweight having tracks rollably engaged with said pin.

14. In a pendulum counterweight system, a shaft extension, a bearing bushing fitted rigidly thereto, a hardened bushing within, and rotationally and axially free relative to the bearing bushing, a pin rollably engaged with the hardened bushing bore wall, and an extension embracing counterweight having tracks rollably engaged with said pin, said extension having an oil feed passage leading to the zone between the bearing bushing and the hardened bushing.

ROLAND CHILTON.
WILTON G. LUNDQUIST.
HENRY C. HILL.